Aug. 7, 1951  C. W. HEATH  2,563,240

RESILIENT SHEET METAL DETACHABLE CLIP

Filed July 10, 1950

Inventor
Clarence Willans Heath,
by Hall & Houghton
Attorneys

Patented Aug. 7, 1951

2,563,240

UNITED STATES PATENT OFFICE 2,563,240

RESILIENT SHEET METAL DETACHABLE CLIP

Clarence Willans Heath, Bleasby, England, assignor to United-Carr Fastener Corporation, Cambridge, Mass., a corporation of Massachusetts Application July 10, 1950, Serial No. 172,829
In Great Britain July 7, 1949

4 Claims. (Cl. 24—73)

This invention relates to fasteners for detachably securing an article to an apertured support. The invention is particularly adapted for mounting tubular condenser units on a supporting panel but is not limited to this particular application of the invention.

According to the present invention a fastener for detachably securing an article to an apertured support is formed from a strip of resilient material which is bent to provide a resilient loop into which the article is to be inserted, and oppositely disposed feet each having a lug at its free end, the feet being relatively yieldable to permit the lugs to snap into an aperture in the support.

The clip may conveniently be formed from a strip of sheet metal.

Figure 1:
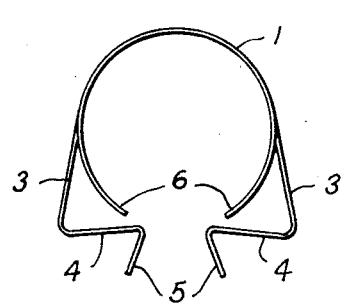
Figure 2:
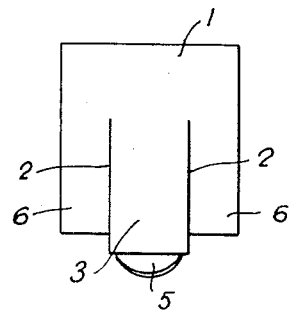
Figure 3:
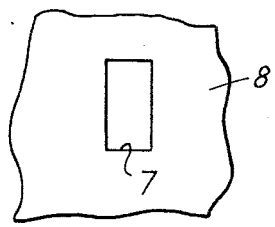

To enable the invention to be fully understood it will now be described with reference to the accompanying drawing in which:

Fig. 1 is a front view of a clip fastener according to one embodiment of the invention, Fig. 2 is a side view thereof, and Fig. 3 is a plan view of the apertured support.

As shown in the accompanying drawing the clip fastener is formed from a single strip of sheet metal which is bent to form a resilient loop portion 1. Adjacent to the open ends, the loop portion has pairs of parallel circumferentially extending slits 2 and the portion between each pair of slits is bent to form means for attaching the clip to an apertured support.

As shown each attaching means comprises a portion 3 extending substantially tangential to the loop 1 and a foot 4, bent at an angle to the portion 3 and extending inwardly and beneath the open end of the loop. The feet 4 are directed towards one another so as to lie in substantially the same plane and the free ends are provided with lugs 5 projecting on the side opposite to the loop 1.

The portions 6 disposed on opposite sides of the attaching means serve as spring fingers which conform to the general circular shape of the loop 1.

The clip is particularly adapted for mounting a tubular article such as a condenser on an apertured support and in use, the tubular body of the condenser or other article is inserted into the loop 1 to extend axially therethrough. Pressure is then applied to close the loop around the tubular body and to move the foot portions towards one another and bring the lugs 5 close together to permit their insertion into a suitably shaped aperture such as 7 formed in a supporting panel 8.

When the pressure on the loop 1 and foot portions 4 is released, the lugs automatically spring outwardly and engage opposite sides of the aperture 7. The lugs are rearwardly inclined, as shown, and accordingly engage the underside of the panel 8 adjacent to the aperture 7, while the foot portions 4 being flat, rest on the upper face of the panel thereby preventing any tendency for the clip to swivel.

When the clip is assembled on the panel 8, the loop 1 and spring fingers 6 will be held in partly compressed condition and will accordingly grip firmly the tubular body of the condenser or other article.

The clip fastener is however readily detachable from the panel as desired.

I claim:

1. A fastener for detachably securing an article to an apertured support, said fastener comprising a strip of resilient sheet material having its central portion shaped to partially embrace the article and having each of its end portions separated longitudinally into relatively short and relatively long portions, said short portions having ends directed toward each other and shaped to complement said central portion in substantially embracing the article, and said long portions diverging laterally from said article embracing portions and beyond the same in the form of resilient supporting legs and then turning inwardly toward each other to form feet having at their adjacent inner ends outwardly diverging lugs for engaging said apertured support.

2. A fastener for detachably securing an article to an apertured support, said fastener comprising a strip of resilient sheet material having its central portion shaped to partially embrace the article and having each of its end portions separated longitudinally into relatively short and relatively long portions, said short portions having ends directed toward each other and shaped to complement said central portion for forming therewith a loop of generally cylindrical form for substantially embracing the article, and said long portions extending substantially tangentially outwardly of said loop and beyond the same in the form of resilient supporting legs and then turning inwardly toward each other to form feet having at their adjacent inner ends outwardly diverging lugs for engaging said apertured support.

3. A fastener for detachably securing an article to an apertured support comprising a strip of resilient sheet material having its central portion shaped to partially embrace the article and having each of its end portions separated longitudinally into relatively short and relatively long portions extending from said central portion in the same general direction, said short portions being turned inwardly toward each other to complement said central portion in substantially embracing the article, and said long portions extending outwardly of said short portions and therebeyond in the form of resilient supporting legs and then turning inwardly toward each other and terminating at their inner ends in outwardly diverging lugs for engaging in said apertured support.

4. A fastener for detachably securing an article to an apertured support, said fastener comprising a strip of resilient sheet material having its central portion shaped to partially embrace the article and having each of its end portions separated longitudinally into relatively short and relatively long portions, said short portions being turned inwardly toward each other to complement said central portion in forming a loop for substantially embracing the article, and said long portions diverging laterally from said article embracing portions and beyond the same in the form of resilient supporting legs and then turning inwardly toward each other and toward said loop to form feet and terminating at their inner ends in outwardly diverging lugs projecting beyond any other portion of said feet for entering the aperture of the support.

CLARENCE WILLANS HEATH.

REFERENCES CITED

The following references are of record in the file of this patent:

UNITED STATES PATENTS

| Number | Name | Date |
|---|---|---|
| 1,398,519 | Hosch | Nov. 29, 1921 |
| 2,216,047 | Place | Sept. 24, 1940 |

FOREIGN PATENTS

| Number | Country | Date |
|---|---|---|
| 560,514 | Great Britain | Apr. 6, 1944 |